United States Patent
Burfin et al.

(10) Patent No.: US 8,867,693 B2
(45) Date of Patent: Oct. 21, 2014

(54) ROD SPACER GRID FOR A NUCLEAR FUEL ASSEMBLY, AND A CORRESPONDING ASSEMBLY

(75) Inventors: Pascal Burfin, Craponne (FR); Michel Bonnamour, Lyons (FR); Gilles Margier, Lyons (FR); Jürgen Stabel-Weinheimer, Erlangen (DE); Mingmin Ren, Erlangen (DE)

(73) Assignee: Areva NP, Courbevoie (FR)

( * ) Notice: Subject to any disclaimer, the term of this patent is extended or adjusted under 35 U.S.C. 154(b) by 940 days.

(21) Appl. No.: 11/791,915

(22) PCT Filed: Oct. 27, 2005

(86) PCT No.: PCT/FR2005/002700
§ 371 (c)(1),
(2), (4) Date: May 30, 2007

(87) PCT Pub. No.: WO2006/058973
PCT Pub. Date: Jun. 8, 2006

(65) Prior Publication Data
US 2008/0118019 A1 May 22, 2008

(30) Foreign Application Priority Data
Nov. 30, 2004 (FR) .................................. 04 12708

(51) Int. Cl.
*G21C 3/34* (2006.01)
*G21C 3/352* (2006.01)

(52) U.S. Cl.
CPC ............... *G21C 3/34* (2013.01); *G21Y 2004/30* (2013.01); *G21C 3/352* (2013.01); *G21Y 2002/303* (2013.01); *Y02E 30/40* (2013.01)
USPC ............ 376/438; 376/409; 376/426; 376/434

(58) Field of Classification Search
CPC ............ G21C 3/30; G21C 3/326; G21C 3/33; G21C 3/332; G21C 3/34–3/3566
USPC .......................................................... 29/723
See application file for complete search history.

(56) References Cited

U.S. PATENT DOCUMENTS

| | | | | |
|---|---|---|---|---|
| 4,426,355 A * | 1/1984 | Burger | | 376/442 |
| 4,705,663 A | 11/1987 | Steven et al. | | 376/442 |
| 4,765,949 A * | 8/1988 | Denizou et al. | | 376/443 |
| 4,839,136 A * | 6/1989 | DeMario et al. | | 376/462 |
| 5,307,392 A | 4/1994 | Bryan | | 376/442 |
| 5,966,419 A | 10/1999 | Petit | | 376/441 |
| 6,421,407 B1 * | 7/2002 | Kang et al. | | 376/439 |

FOREIGN PATENT DOCUMENTS

| | | |
|---|---|---|
| EP | 0 052 924 | 6/1982 |
| EP | 0 184 064 | 6/1986 |
| EP | 0 240 411 | 10/1987 |
| FR | 2 163 482 | 12/1972 |
| FR | 2 736 190 | 6/1995 |
| GB | 1 413 306 | 11/1975 |

* cited by examiner

*Primary Examiner* — Jack W Keith
*Assistant Examiner* — Marshall O'Connor
(74) *Attorney, Agent, or Firm* — Davidson, Davidson & Kappel, LLC (57) ABSTRACT

A grid (13) for supporting nuclear fuel pencils (3) for a nuclear fuel assembly (1) comprising a peripheral belt (17), the peripheral belt (17) comprising on at least one of its edges (35, 37) guide fins (33) is disclosed. The edge (35, 37) of the peripheral belt (17) has between the adjacent guide fins (33) recesses (39) towards the inside of the grid (13). The invention is applicable, for example, to pressurized water reactors.

19 Claims, 7 Drawing Sheets

ROD SPACER GRID FOR A NUCLEAR FUEL ASSEMBLY, AND A CORRESPONDING ASSEMBLY

The present invention relates to a grid for spacing nuclear fuel rods in a nuclear fuel assembly, the grid being of the type defining a substantially regular array of cells and including a peripheral belt, the peripheral belt having guide fins on at least one of its edges. The invention applies in particular to fuel assemblies for pressurized water nuclear reactors.

BACKGROUND

Document FR—2 736 190 describes a spacer grid of the above-specified type. The peripheral belt is made up of plane outer plates that are assembled to one another. The guide fins are folded relative to the planes of their respective plates towards the inside of the grid. Such a grid makes it possible to reduce the lateral deformation of the assembly that includes it. Inclining the fins inwards serves in particular to limit any risk of the spacer grids of two adjacent assemblies catching while the assemblies are being handled.

Nevertheless, a risk still exists of grids catching in certain configurations that are particularly penalizing. This applies in particular when two adjacent assemblies are offset by half the pitch of the array of fuel rods. During a handling operation, the free ends of the guide fins of one grid in a first one of the adjacent assemblies can then become engaged between two adjacent fins of a grid in the second of the two adjacent assemblies, thus catching the edge of the grid of the second assembly. If in addition, one of the two assemblies bears laterally against the other of the two adjacent assemblies to such an extent as to cause the peripheral rods of at least one of the two assemblies to bend and/or be displaced laterally, the risk of the grids of the two adjacent assemblies catching is increased. Such catching can lead to adjacent assemblies being deformed and ought therefore to be avoided.

SUMMARY OF THE INVENTION

An object of the invention is to solve this problem by limiting the risk of the grids of two adjacent assemblies catching.

To this end, the invention provides a grid of the above-specified type, characterized in that said edge of the peripheral belt presents setbacks towards the inside of the grid between adjacent guide fins.

In particular embodiments, the grid may include one or more of the following characteristics, taken in isolation or in any technically feasible combination:

the setbacks are formed by bosses in the peripheral belt;
through orifices are formed through the peripheral belt to allow cooling fluid to pass laterally;
the through orifices are positioned substantially in the centers of the outside faces of the peripheral cells defined by the peripheral belt;
the peripheral belt does not have springs for laterally holding nuclear fuel rods received in the peripheral cells;
the grid includes crossed inner plates, which inner plates are surrounded by the peripheral belt;
the inner plates present notches for mutually engaging the plates at their cross-points, and the notches have respective regions of reduced width;
the guide fins bear against regions of the inner plates that constitute stiffeners;
the inner plates adjacent to the peripheral belt include abutments for laterally retaining the nuclear fuel rods, which abutments project into the peripheral cells from their inside faces facing the peripheral belt;
the lateral retaining abutments are formed in the bottom edges and the top edges of the inner plates adjacent to the peripheral belt;
the peripheral belt presents cups set back towards the inside of the grid and in which the inner plates are welded to the peripheral belt; and
the bottom edges of the inner plates are substantially rectilinear in register with the faces of cells that are to receive guide tubes of the nuclear fuel assembly.

The invention also provides a nuclear fuel assembly comprising nuclear fuel rods, a skeleton for supporting the rods, the support skeleton comprising guide tubes, nozzles disposed on the longitudinal ends of the guide tubes, and grids for spacing the rods, the assembly being characterized in that at least one grid is a grid as defined above.

BRIEF DESCRIPTION OF THE DRAWINGS

The invention can be better understood on reading the following description given purely by way of example, and made with reference to the accompanying drawings, in which.

DETAILED DESCRIPTION

Figure 1:
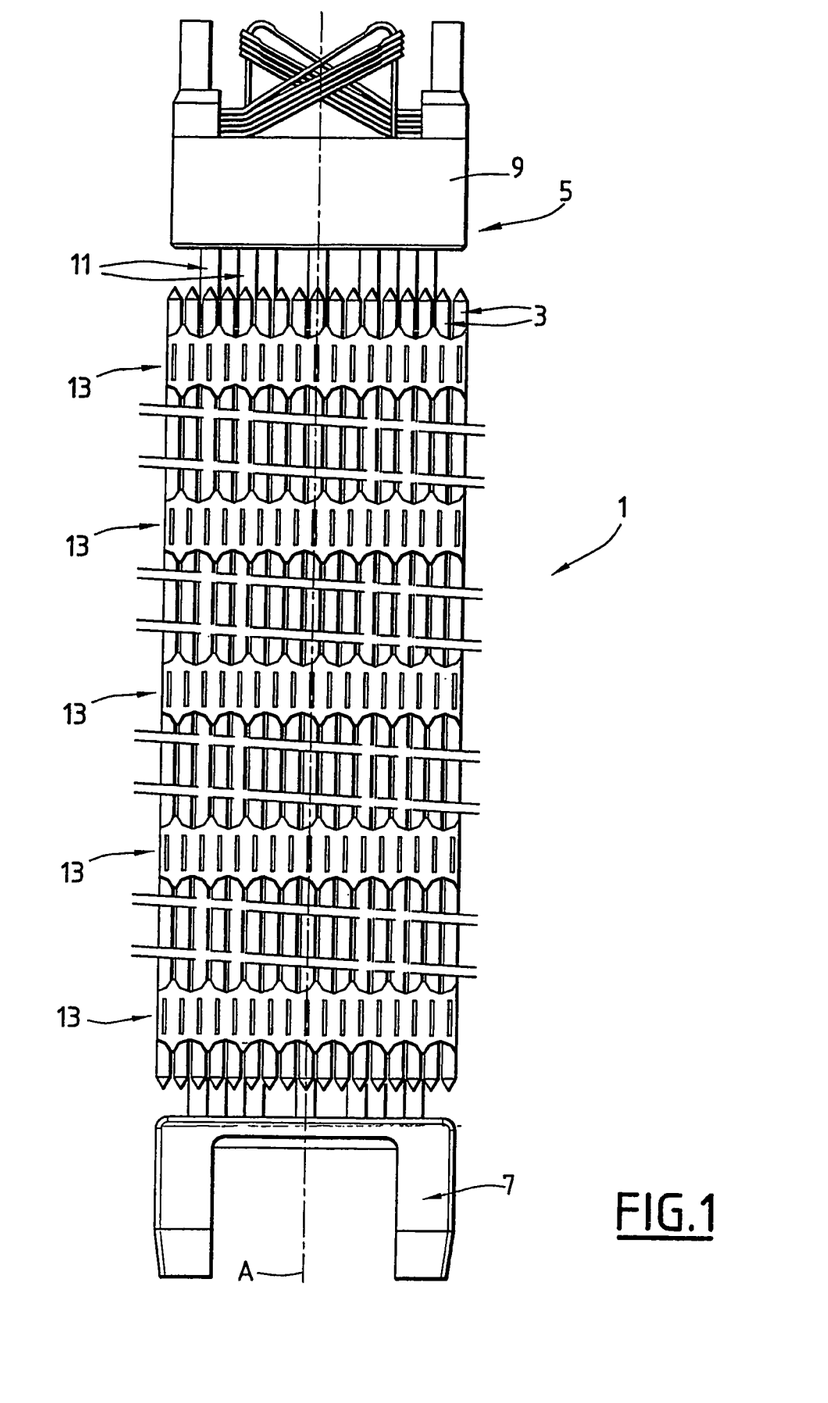
FIG. 1 is a diagrammatic side view of a nuclear fuel assembly for a pressurized water reactor.
Figure 2:
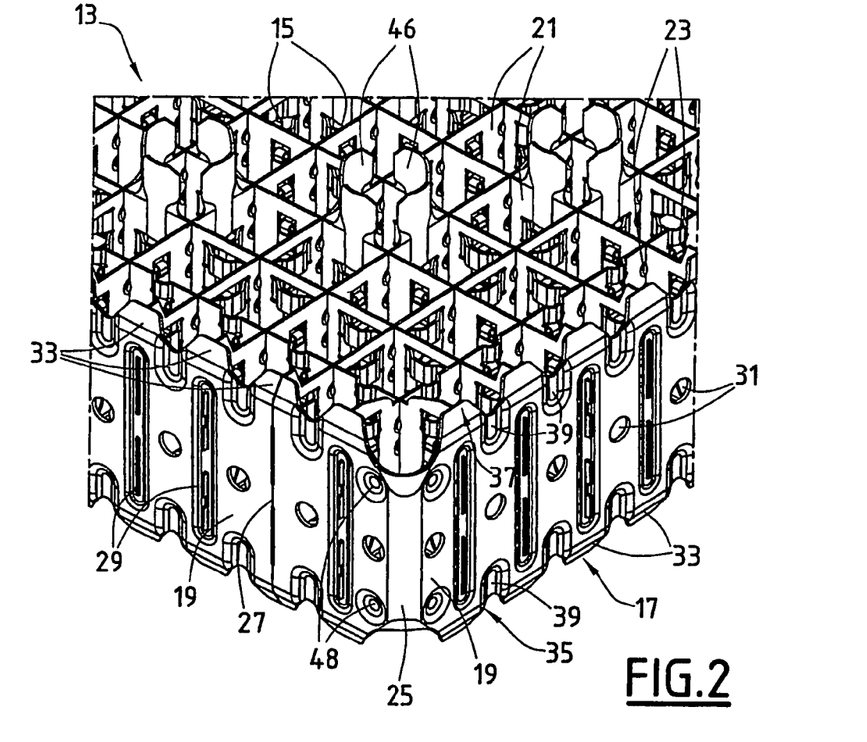
FIGS. 2 and 3 are fragmentary diagrammatic views in perspective showing a spacer grid suitable for forming part of the FIG. 1 assembly, seen respectively from above and from below.

In order to illustrate the context of the invention, FIG. 1 is a diagram showing a nuclear fuel assembly 1 for a pressurized water reactor. Water thus performs therein both a cooling function and a moderation function, i.e. it slows down neutrons produced by the nuclear fuel.

The assembly 1 extends vertically in rectilinear manner along a longitudinal direction A. This direction is the flow direction of the cooling fluid, i.e. water, when the assembly 1 is placed in a core. More precisely, the water flows upwards therethrough.

In conventional manner, the assembly 1 mainly comprises nuclear fuel rods 3 and a structure or skeleton 5 for supporting the rods 3.

The support skeleton conventionally comprises:

a bottom nozzle 7 and a top nozzle 9 disposed at the longitudinal ends of the assembly 1;
guide tubes 11 for receiving the rods of a control and stop cluster (not shown) for the nuclear reactor; and
grids 13 for spacing the rods 3 apart.

The nozzles 7 and 9 are secured to the longitudinal ends of the guide tubes 11.

The rods 3 extend vertically between the nozzles 7 and 9. The rods 3 are disposed at the nodes of a substantially regular square-based array where they are spaced apart laterally by the grids 13. Some of the nodes of the array are occupied by the guide tubes 11, and possibly also by a central instrumentation tube.

Generally, the top grid 13 and possibly the bottom grid 13 serve not only to hold the rods spaced apart laterally as mentioned above, but also to support the rods 3 longitudinally. The other grids 13 serve solely to space the rods apart laterally.

Below, the invention is described with reference to an intermediate grid 13, i.e. a grid that serves only to provide lateral spacing. Nevertheless, it can also be applied to grids 13 that also perform a function of supporting rods 3.

As shown in FIGS. 2 to 5, the grid 13 comprises:
crossed inner plates 15; and
a peripheral belt 17 surrounding the inner plates 15 and made up of outer plates 19.

Figure 6:
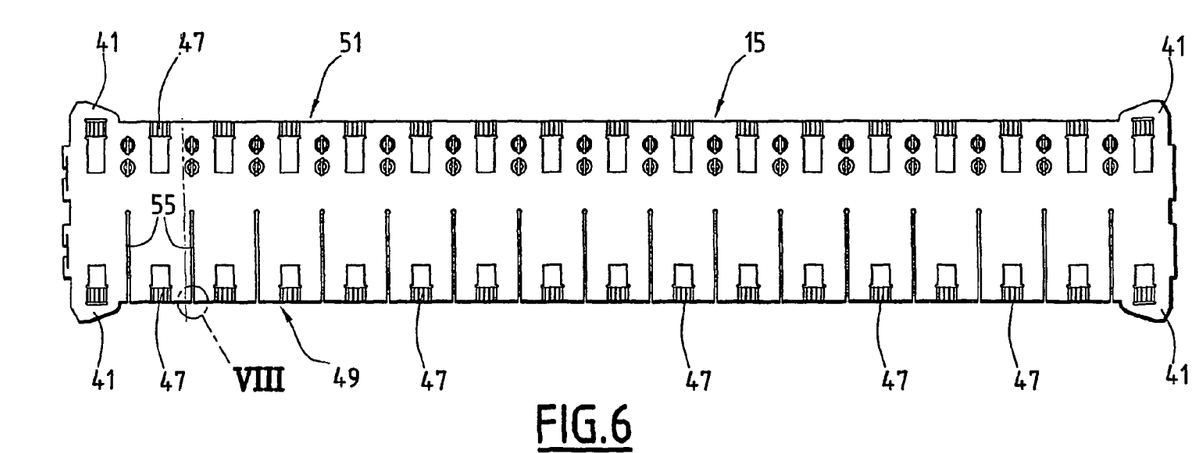
FIGS. 6 and 7 are diagrammatic side views showing two internal plates used for making the grid of FIGS. 2 and 3.
Figure 7:
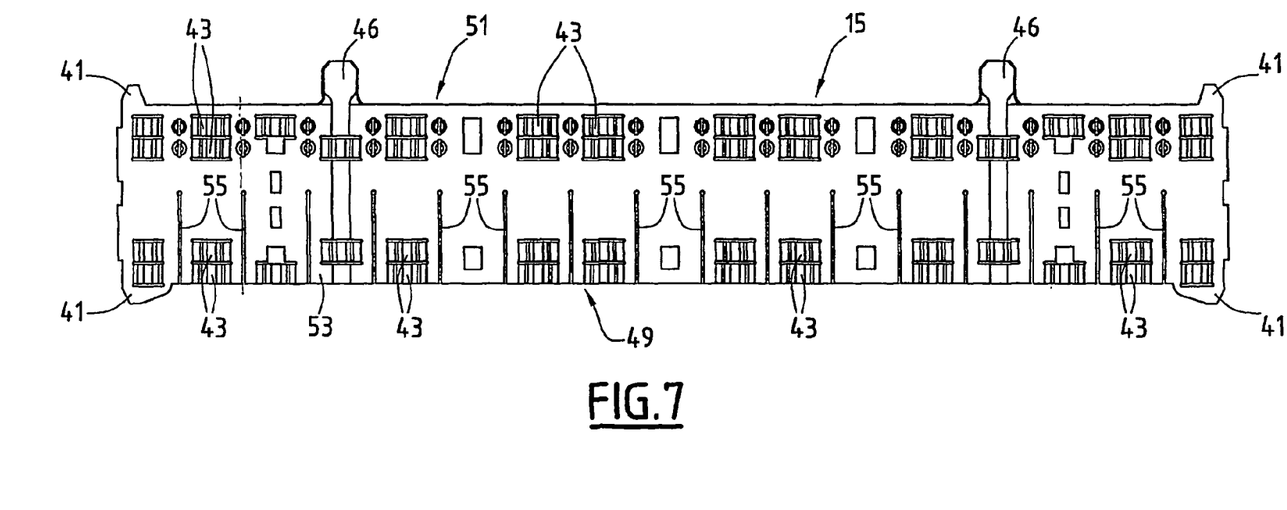

FIGS. 6 and 7 show two of the sixteen different inner plates 15 used for making the grid 13.

Between them, the inner and outer plates 15 and 19 define a square array of cells 21 and 23. In the example shown, this array comprises 17×17 cells, however in other variants the grid 13 could comprise some other number of cells, e.g. 15×15, 16×16, . . . .

Numerical reference 21 designates the inner cells, i.e. those that are defined solely by inner plates 15. Numerical reference 23 designates the peripheral cells that are bordered by the peripheral belt 17 and that are therefore defined both by the belt and by inner plates 15.

The cells 21 and 23 are centered on the nodes of the array of fuel rods 3, and for the most part they receive the fuel rods 3. Some of the cells 21 receive guide tubes 11, and the central cell 21 can receive a central instrumentation tube. Each cell 21, 23 in plan view is substantially square in shape and thus presents four side walls that are opposite in pairs.

The peripheral belt 17 in plan view is substantially square in shape with four corners 25.

Each outer plate 19 forms one of the corners 25; and the plates 19 are assembled together in regions 27 that are distinct from the corners 25, e.g. by being welded together.

The outer plates 19 present cups 29 for assembly with the inner plates 15.

These cups 29, e.g. made by stamping, are set back towards the inside of the grid 13 and they extend longitudinally across the plates 19. They are pierced to receive the lateral ends of the inner plates 15 which are welded in the bottoms of the cups 29.

The lateral ends of the plates 15 situated in register with assembly regions 27 are held captive by the lateral edges of the adjacent outer plates 19. In the example described, the peripheral belt 17 does not present any cups 29 in the assembly regions 27.

The plates 19 of the peripheral belt 17 also present orifices 31 for allowing the cooling fluid to pass laterally.

In the example shown, these orifices 31 are circular and they are positioned halfway up the belt 17. Each orifice 31 opens out into a peripheral cell 23 and is substantially centered relative to said peripheral cell 23. In other words, the orifice 31 is substantially in register with the longitudinal axis of the rod 3 received in the peripheral cell 23 in question.

In register with the junctions with the plates 15, the peripheral belt 17 has fins 33 for guiding an assembly 1 adjacent to the assembly in question, and for guiding the cooling fluid.

These guide fins 33 project upwards and downwards and they are folded towards the inside of the grid 13.

Between the guide fins 33, the bottom and top edges 35 and 37 of the belt 17 present setbacks 39 towards the inside of the grid 13. The setbacks 39 formed in the bottom edge 35 extend upwards and the setbacks 39 formed in the top edge 37 extend downwards such that in face view the setbacks 39 are oblong in shape.

The setbacks 39 are made by stamping the outer plates 19 towards the inside of the grid 13 so as to form bosses 40 projecting towards the insides of the peripheral cells 23.

Figure 4:
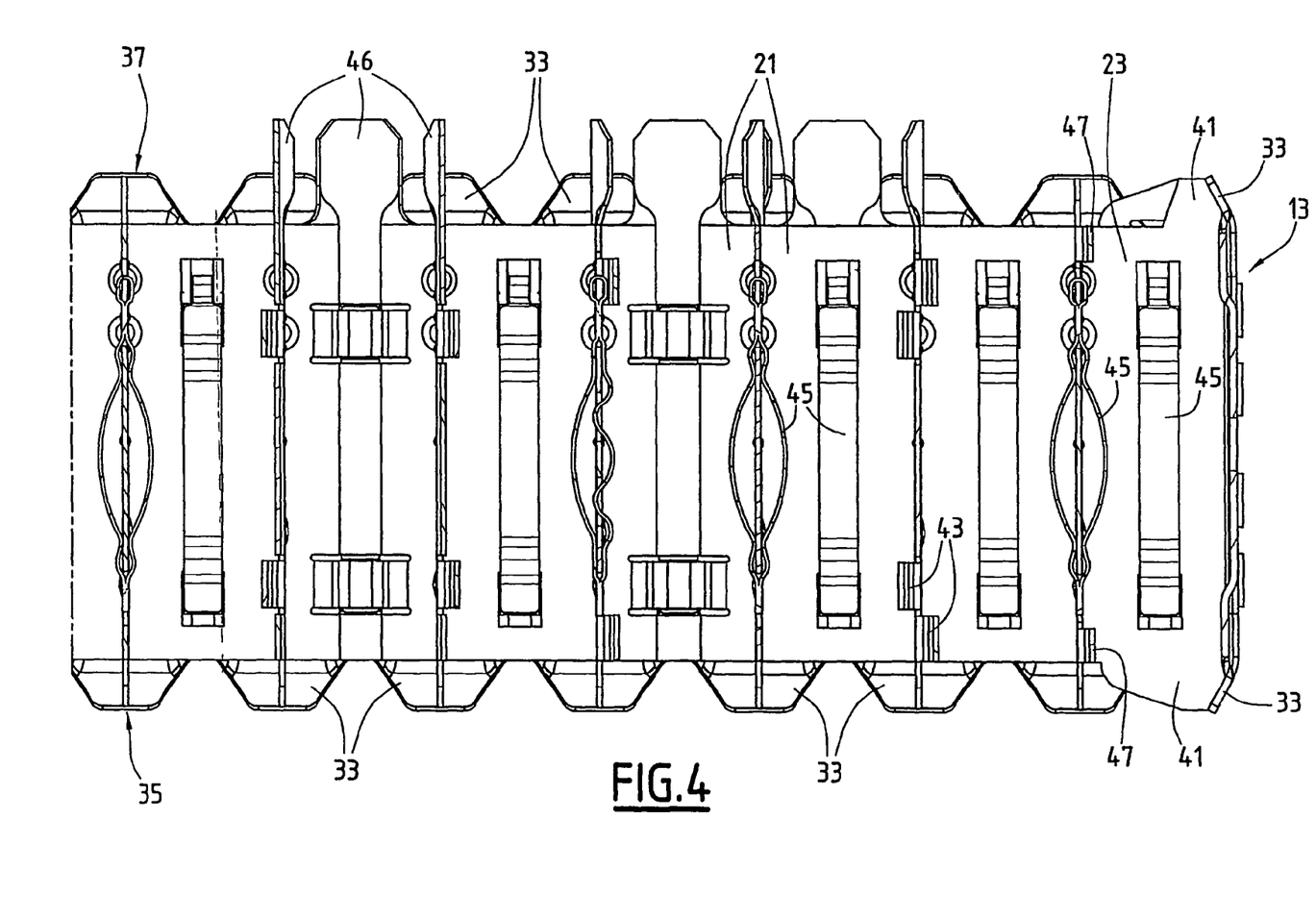
FIG. 4 is a fragmentary diagrammatic view in lateral section of the grid of FIGS. 2 and 3.

As shown more particularly by FIGS. 4, 6, and 7, the inner plates 15 have stiffeners 41 at their lateral ends projecting upwards and downwards and against which the fins 33 bear. The fins 33 may be welded to the stiffeners 41.

Inside an inner cell 21 receiving a rod 3, the rod 3 is held laterally by dimples 43 made by cutting and embossing the metal of the inner plates 15, and also by springs 45, e.g. fitted on the inner plates 15.

More precisely (FIG. 5), for each inner cell 21, each of the faces of the cell 21 is provided either with a pair of dimples 43 projecting towards the inside of the cell, or with a spring 45, each spring 45 facing a pair of dimples 43.

Figure 5:
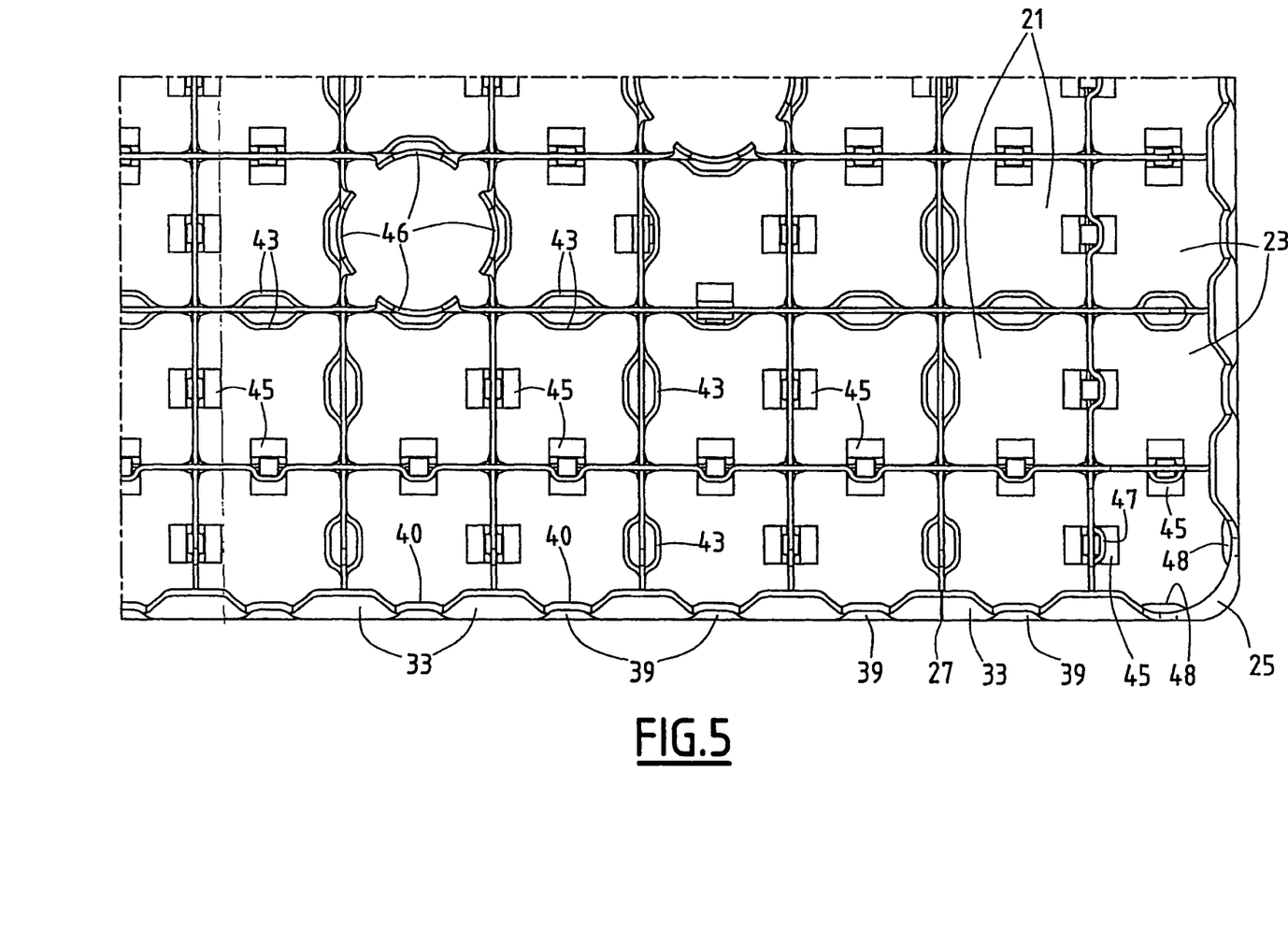
FIG. 5 is a fragmentary diagrammatic view of the grid of FIGS. 2 and 3 seen from above.

Concerning those cells 21 that are to receive guide tubes 11, it can be seen that the inner plates 15 are also provided with welding tabs 46 that project upwards from the lateral faces of each cell 21 in question, and that are for welding to the guide tubes 11. These tabs 46 are shorter than in the prior art, for example they have a height of 8 mm.

Concerning the peripheral cells 23, and as shown in FIG. 5, the rods 3 that are received therein are held laterally in each cell 23 by two springs 45, a pair of dimples 43, and a pair of bosses 40. The bosses 40 formed in the peripheral belt 17 face one of the springs 45, and the pair of dimples 43 likewise face one of the springs 45.

For the peripheral cells 23 situated in the corners 25, the rods are held by two springs 45 and by two pairs of circular dimples 48 formed in the peripheral belt 17 and facing the springs 45.

For each of the peripheral cells 23, including the corner cells 23, the inner face(s) opposite the peripheral belt 17 is/are provided with a pair of abutments 47 for laterally retaining the rod 3 received in the cell 23 in question. These abutments 47 are formed in the inner plates 15 lying beside the peripheral belt 17.

One such inner plate 15 is shown in FIG. 6 where it can be seen that for each cell 23 one of the abutments 47 is situated at the bottom edge 49 of the plate 15, and the other at the top edge 51 of the plate 15. These abutments 47 are formed by cutting and embossing the material of the plate 15 towards the insides of the cells 23 in question.

In the example described, each pair of abutments 47 lies on either side of a spring 45 facing the peripheral belt 17.

Also in this example, the peripheral belt 17 is not provided with a spring for holding the peripheral rods 3 laterally.

Figure 3:
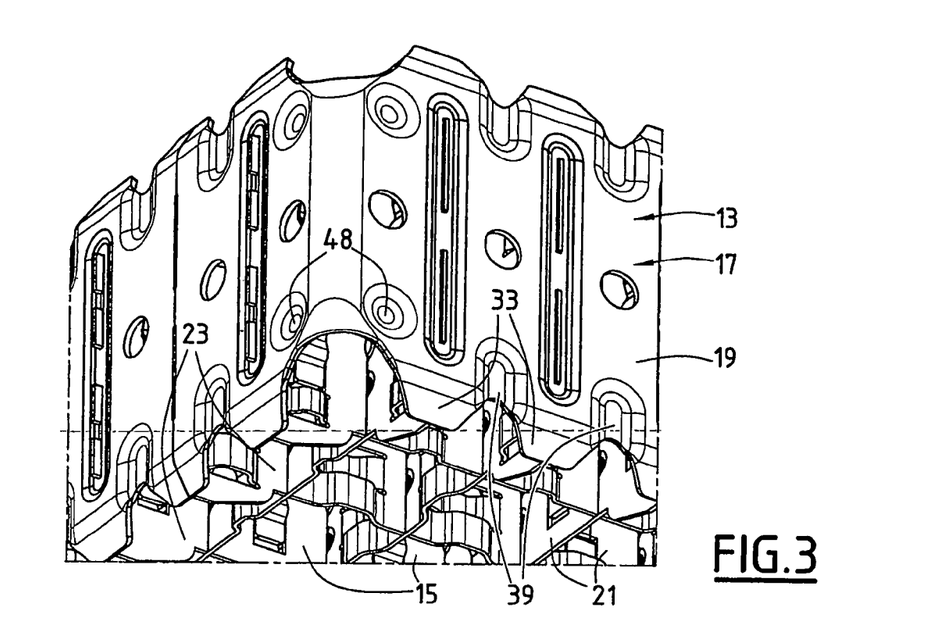

It should be observed that the bottom edges 49 of the bottom plates 15 are rectilinear in the faces 53 of the cells 21 that receive the guide tubes 11 (FIGS. 3 and 7). In particular, these faces 53 do not present any bottom cutout as in the prior art, thereby improving the ability of the grid 13 to withstand buckling.

In order to assemble the plates 15 at their cross-points, notches 55 are formed in the plates 15. For half of the plates, the notches 55 open out into their bottom edges 49, for the other half, the notches 55 open out into their edges 51, thus enabling all of the inner plates 15 to be mutually engaged via their notches 55.

Figure 8:
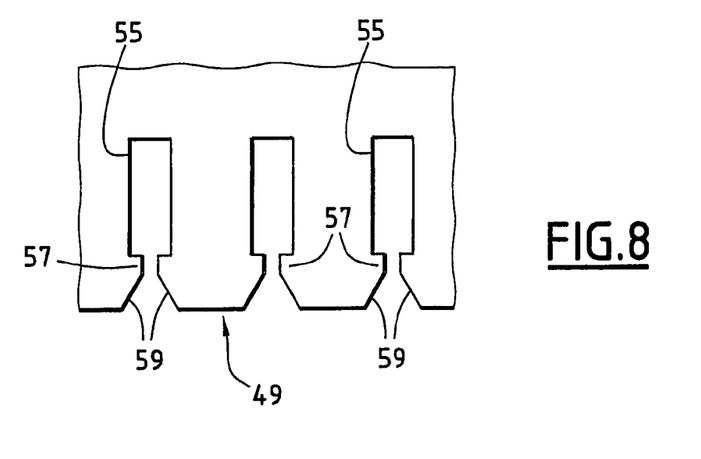
FIG. 8 is a diagrammatic view on a larger scale the portion in circle VIII of FIG. 6.

As shown very diagrammatically in FIG. 8, each notch 55 presents at its open end a constriction 57 leading to the corresponding edge 49 or 51 via chamfers 59. These chamfers 59 make it easier to engage the inner plates 15 mutually via the notches 55 at their cross-points.

The constrictions 57, which correspond to a reduction in width of the order of 100 micrometers (μm) to 200 μm, for example, serve to provide satisfactory mechanical retention between the inner plates 15 at their cross-points. This makes it possible locally to reduce clearance between the mutually engaged inner plates 15 and thus to improve the quality of the welding performed subsequently at the cross-points.

Figure 9:
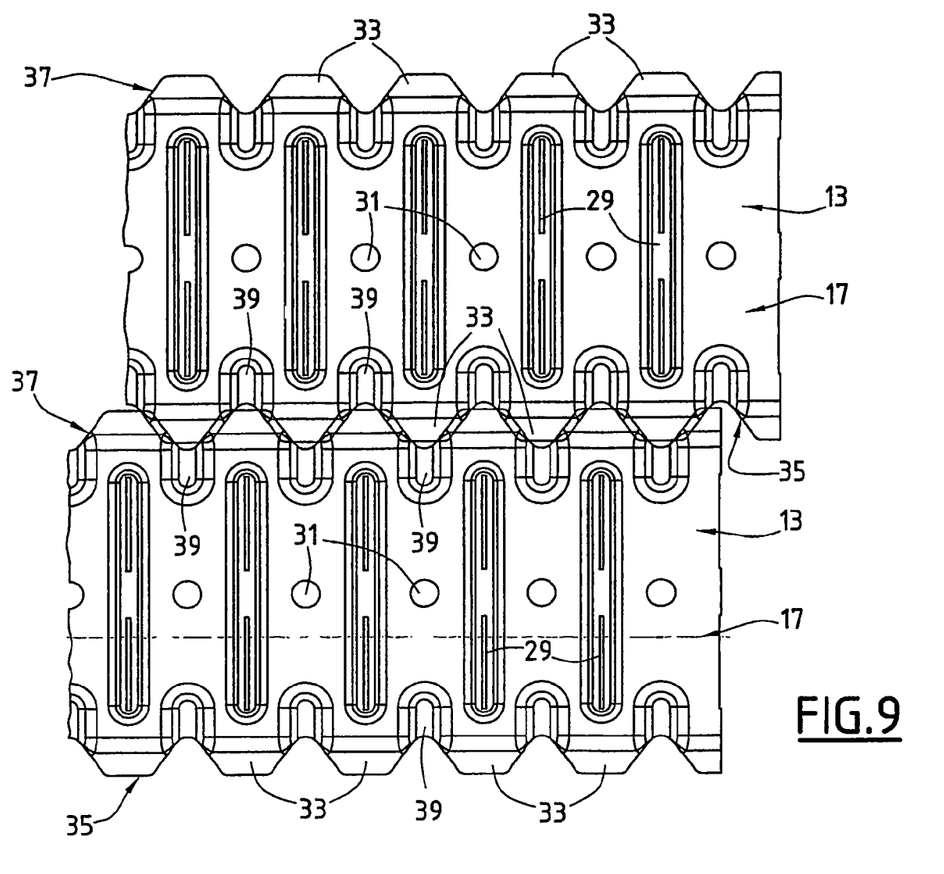
FIG. 9 is a diagrammatic face view showing the relative position of two adjacent assembly grids during a handling operation.
Figure 10:
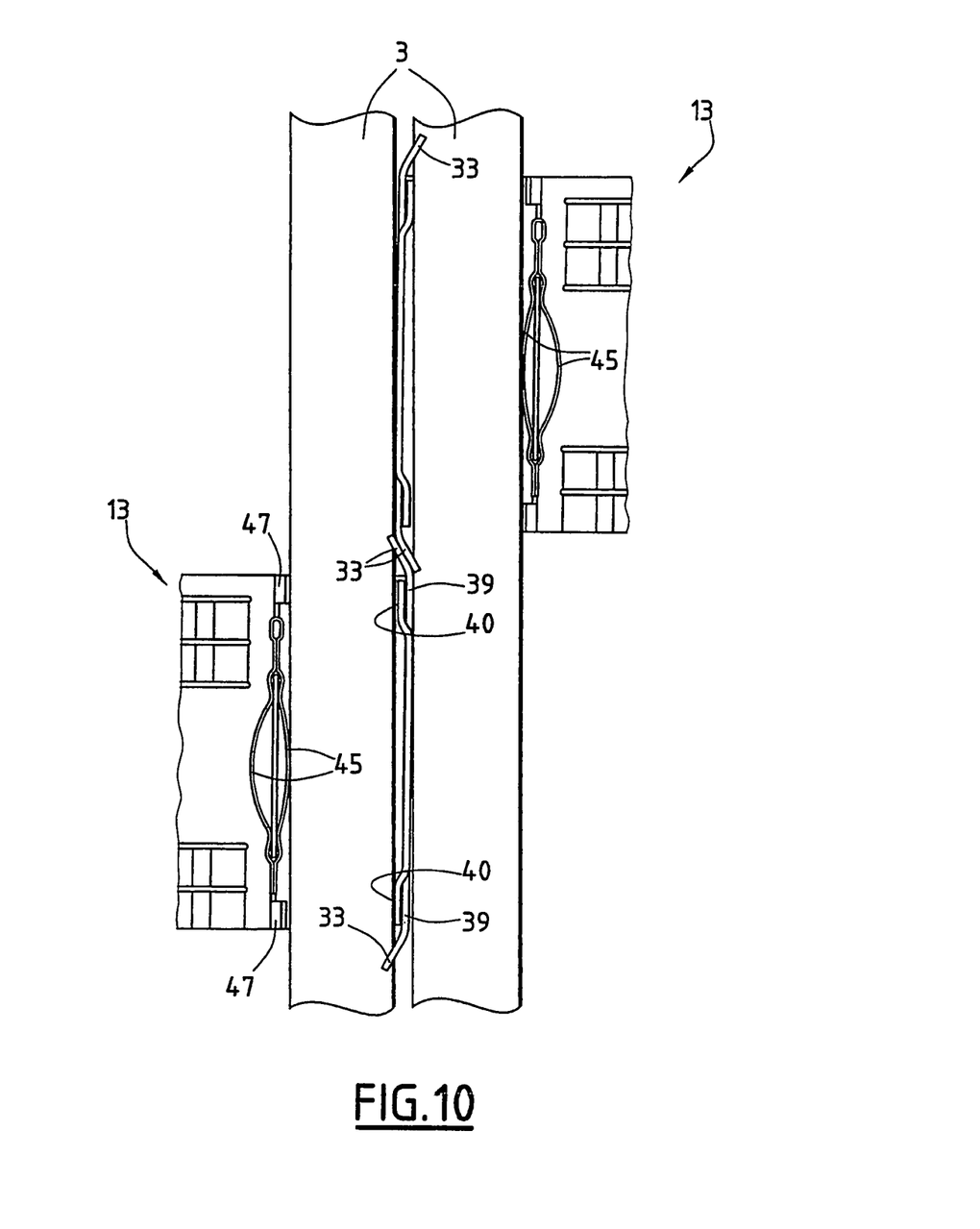
FIG. 10 is a fragmentary diagrammatic side view of the two assemblies of FIG. 9.

FIGS. 9 and 10 show the configuration mentioned in the introduction of the present description, constituting one of the situations in which the risk of catching between two adjacent assemblies 1 used to be the greatest.

In FIG. 9, there can be seen the peripheral belts 17 of two grids 13 of two adjacent assemblies 1. These two grids 13 are offset laterally by half the pitch of the arrays of nuclear fuel rods.

The bottom grid 13 belongs to a first assembly 1 and the top grid 13 belongs to a second assembly 1 that is being handled, which explains why one is situated above the other.

Because of the lateral offset, the top fins 33 of the bottom grid 13 lie between the bottom guide fins 33 of the top grid 13 and are engaged in the bottom setbacks 39 of the top grid 13.

Similarly, the bottom fins 33 of the top grid 13 are engaged in the top setbacks 39 of the bottom grid 13.

Thus, the risk that the free ends of the guide fins 33 of a grid 13 might catch a longitudinal edge of the adjacent grid 13 is small.

This risk is made smaller still in that in the event of one of the assemblies 1 pushing the peripheral rods 3 of the other assembly laterally towards the inside, these peripheral rods 3 will come to bear against the abutments 47, thereby limiting both the bending and the displacement of the rods 3 towards the inside of the assembly 1. This is shown in FIG. 10 where the rods 3 directly adjacent to the peripheral rods 3 are omitted.

The abutments 47 limit any displacement or bending of the rods 3 to a greater extent by being placed at the bottom and top edges 49 and 51 of the plates 15 adjacent to the peripheral belt 17.

The bosses 40 formed by the setbacks 39 in the peripheral belt 17 are disposed at the longitudinal ends of the grid 13 and thus provide good lateral holding and increased restriction on lateral displacement and bending of the rods 3.

The use of setback cups 29 for the purpose of welding the peripheral belt 17 to the inner plates 15 likewise makes it possible to limit any risk of adjacent assemblies 1 catching.

Thus, the risks of the grids 13 of adjacent assemblies 1 catching are limited, particularly during handling.

The presence of the stiffeners 41 for the guide fins 33 serves to increase the stiffness of the guide fins 33 and limits any risk of them deforming, and also any risk of catching that might result from deformation of the outlet plates 19.

The orifices 31 serve to increase the transverse hydraulic transparency of the grid 13 and thus to increase the ability of the assembly 1 to withstand buckling, and thus reduce the risk of two adjacent assemblies 1 catching.

The characteristics described above, and in particular the setbacks 39, the abutments 47, the constrictions 57, the orifices 31, the stiffeners 41, the cups 29, and the rectilinear bottom edges of the faces 53 of the cells that receive guide tubes 11, can be used independently of one another for achieving the overall object of limiting deformation of nuclear fuel assemblies in a reactor.

In certain configurations, the setbacks 39 may be present only at one longitudinal edge of the grid 13.

What is claimed is:

1. A grid for spacing nuclear fuel rods in a nuclear fuel assembly, the grid defining a substantially regular array of cells and comprising:
   a peripheral belt having an upper edge and a lower edge, the peripheral belt having guide fins extending inwardly on at least one of the upper and lower edges, the peripheral belt in plan view having a substantially square shape with four sides and four corners, the at least one upper and lower edge of the peripheral belt having setbacks formed in the at least one upper and lower edge of the peripheral belt and extending inwardly and positioned between adjacent guide fins of the same side of the at least one upper and lower edge; and
   crossed inner plates surrounded by the peripheral belt,
   wherein the guide fins bear against regions of the inner plates that constitute stiffeners.

2. The grid according to claim 1, wherein the setbacks are formed by bosses in the peripheral belt.

3. The grid according to claim 1, wherein the peripheral belt has through orifices to allow cooling fluid to pass laterally.

4. The grid according to claim 3, wherein the regular array of cells includes peripheral cells having outside faces defined by the peripheral belt, the through orifices being positioned substantially in centers of the outside faces.

5. The grid according to claim 4, wherein the peripheral belt lacks springs for laterally holding nuclear fuel rods received in the peripheral cells.

6. The grid according to claim 1, wherein the inner plates present notches for mutually engaging the inner plates at cross-points, the notches having respective regions of reduced width.

7. The grid according to claim 1, wherein the inner plates adjacent to the peripheral belt include abutments for laterally retaining the nuclear fuel rods, the abutments projecting into the peripheral cells from inside faces facing the peripheral belt.

8. The grid according to claim 7, wherein the lateral retaining abutments are formed in the bottom edges and the top edges of the inner plates adjacent to the peripheral belt.

9. The grid according to claim 1, wherein the peripheral belt presents cups set back towards the inside of the grid, the inner plates being welded to the peripheral belt in the cups.

10. The grid according to claim 1, wherein the bottom edges of the inner plates are substantially rectilinear in register with faces of cells for receiving guide tubes of the nuclear fuel assembly.

11. A nuclear fuel assembly comprising:
   nuclear fuel rods;
   a skeleton for supporting the rods, the support skeleton comprising guide tubes;
   nozzles disposed on longitudinal ends of the guide tubes; and
   grids for spacing the rods, the grids including at least one grid according to claim 1.

12. The grid according to claim 1 wherein one of the cells of the grid is a peripheral cell bordering the peripheral belt, the peripheral cell having a fin section of one of the guide fins extending over the peripheral cell and a further fin section of one of the adjacent guide fins extending over the peripheral cell.

13. The grid according to claim 12 wherein one of the setbacks is located between the fin section and the further fin section.

14. A grid for spacing nuclear fuel rods in a nuclear fuel assembly, the grid defining a substantially regular array of cells and comprising:
- a peripheral belt having an upper edge and a lower edge, the peripheral belt having guide fins extending inwardly on at least one of the upper and lower edges, the peripheral belt in plan view having a substantially square shape with four sides and four corners, the at least one upper and lower edge of the peripheral belt having setbacks formed in the at least one upper and lower edge of the peripheral belt and extending inwardly and positioned between adjacent guide fins of the same side of the at least one upper and lower edge; and
- crossed inner plates surrounded by the peripheral belt,
- wherein the inner plates present notches for mutually engaging the inner plates at cross-points, the notches having respective regions of reduced width.

15. The grid according to claim 14, wherein the setbacks are formed by bosses in the peripheral belt.

16. The grid according to claim 14, wherein the peripheral belt has through orifices to allow cooling fluid to pass laterally.

17. A grid for spacing nuclear fuel rods in a nuclear fuel assembly, the grid defining a substantially regular array of cells and comprising:
- a peripheral belt having an upper edge and a lower edge, the peripheral belt having guide fins extending inwardly on at least one of the upper and lower edges, the peripheral belt in plan view having a substantially square shape with four sides and four corners, the at least one upper and lower edge of the peripheral belt having setbacks formed in the at least one upper and lower edge of the peripheral belt and extending inwardly and positioned between adjacent guide fins of the same side of the at least one upper and lower edge; and
- crossed inner plates surrounded by the peripheral belt,
- wherein the inner plates adjacent to the peripheral belt include abutments for laterally retaining the nuclear fuel rods, the abutments projecting into the peripheral cells from inside faces facing the peripheral belt,
- wherein the lateral retaining abutments are formed in the bottom edges and the top edges of the inner plates adjacent to the peripheral belt.

18. The grid according to claim 17, wherein the setbacks are formed by bosses in the peripheral belt.

19. The grid according to claim 17, wherein the peripheral belt has through orifices to allow cooling fluid to pass laterally.

* * * * *